US008599700B2

(12) United States Patent
Chen et al.

(10) Patent No.: US 8,599,700 B2
(45) Date of Patent: Dec. 3, 2013

(54) SYSTEM AND METHOD FOR USING AD HOC NETWORKS IN COOPERATION WITH SERVICE PROVIDER NETWORKS

(75) Inventors: John Anthony Chen, Ashburn, VA (US); Geoff Filippi, Ashburn, VA (US); Kenneth Gould, Oakton, VA (US); Brian Coughlin, Reston, VA (US)

(73) Assignee: Time Warner Cable Enterprises LLC, New York, NY (US)

( * ) Notice: Subject to any disclaimer, the term of this patent is extended or adjusted under 35 U.S.C. 154(b) by 333 days.

(21) Appl. No.: 12/718,372

(22) Filed: Mar. 5, 2010

(65) Prior Publication Data

US 2011/0216655 A1 Sep. 8, 2011

(51) Int. Cl.
*G01R 31/08* (2006.01)
(52) U.S. Cl.
USPC ........... 370/241; 370/327; 370/328; 370/329; 370/338; 370/315; 370/242; 370/244; 370/248; 370/217; 370/218
(58) Field of Classification Search
USPC ...................................... 370/332; 375/240.01
See application file for complete search history.

(56) References Cited

U.S. PATENT DOCUMENTS

| | | | | |
|---|---|---|---|---|
| 7,342,907 B2 * | 3/2008 | Kim et al. | ...................... | 370/338 |
| 7,729,328 B2 * | 6/2010 | Thubert et al. | ................. | 370/338 |
| 7,787,416 B2 * | 8/2010 | Gidwani | ........................ | 370/329 |
| 7,933,247 B2 * | 4/2011 | Gidwani | ........................ | 370/332 |
| 8,125,932 B2 * | 2/2012 | Yang | ............................... | 370/260 |
| 2004/0236863 A1 * | 11/2004 | Shen et al. | ..................... | 709/231 |
| 2008/0134258 A1 * | 6/2008 | Goose et al. | ..................... | 725/91 |
| 2010/0172403 A1 * | 7/2010 | Rabenold et al. | ......... | 375/240.01 |
| 2011/0202651 A1 * | 8/2011 | Hilt et al. | ....................... | 709/224 |

FOREIGN PATENT DOCUMENTS

DE 102006014592 * 3/2006
DE 102006014592 A1 * 10/2007

OTHER PUBLICATIONS

NonStop: Continuous Multimedia Streaming in Wireless Ad Hoc Networks with Node Mobility—IEEE Journal on Selected Areas in Communications, vol. 21, No. 10, Dec. 2003.*

* cited by examiner

*Primary Examiner* — Charles C Jiang
*Assistant Examiner* — Deepa Belur
(74) *Attorney, Agent, or Firm* — The Marbury Law Group PLLC

(57) ABSTRACT

Systems and methods for using ad hoc networks in cooperation with service provider networks. Multi-network devices communicate with each other as peers in an ad hoc network while each accessing a service provider network. The multi-network devices may each receive the same real-time multimedia stream, be it broadcast or unicast, while sharing stream parity information. The peers may take corrective action to maintain uninterrupted playback of the real-time multimedia stream with no or minimal loss in perceived quality. The peers may further cooperate to facilitate bandwidth and power optimization, fast channel switching, and real-time mobile traffic and network analysis, displays and alerts.

14 Claims, 13 Drawing Sheets

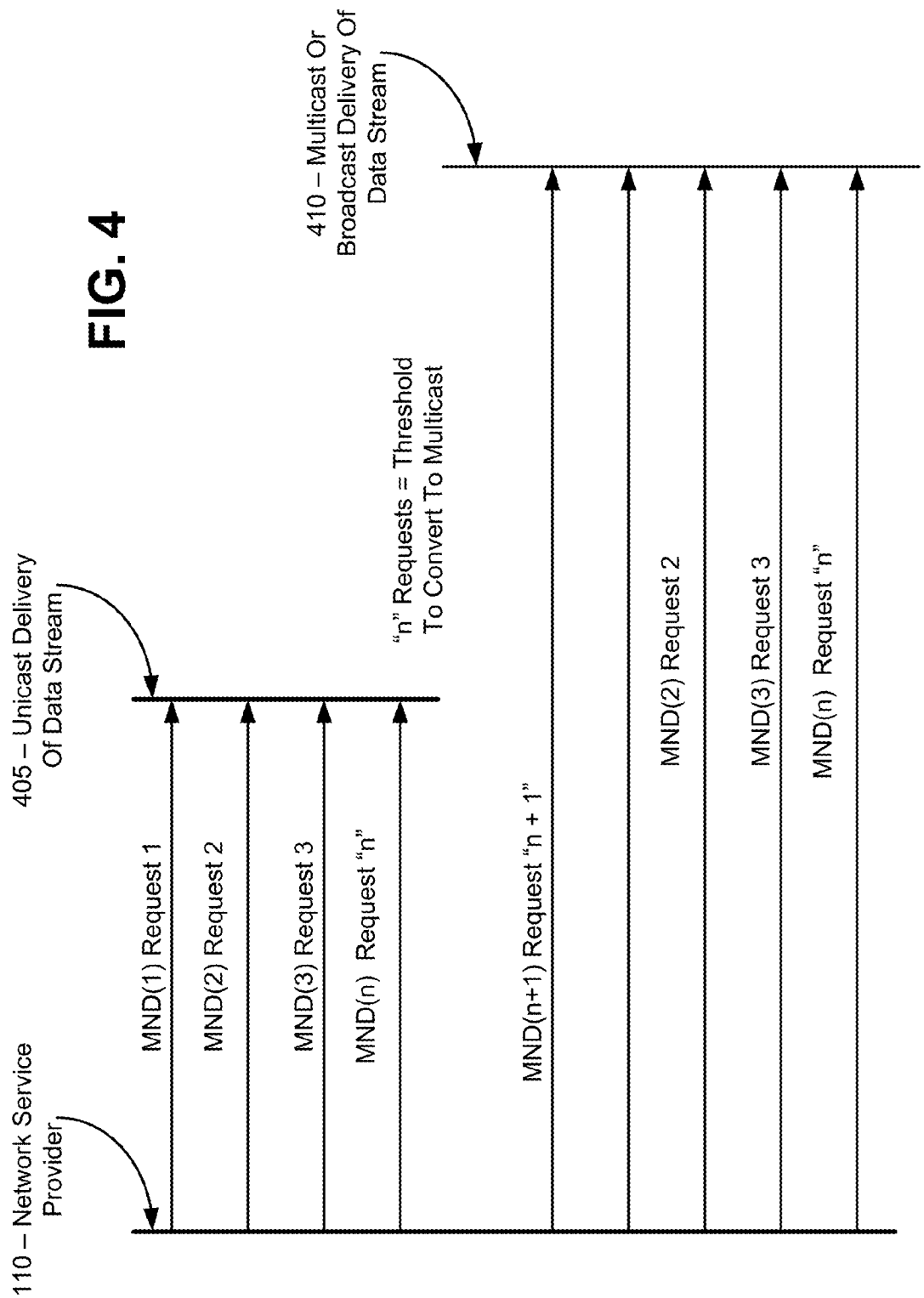

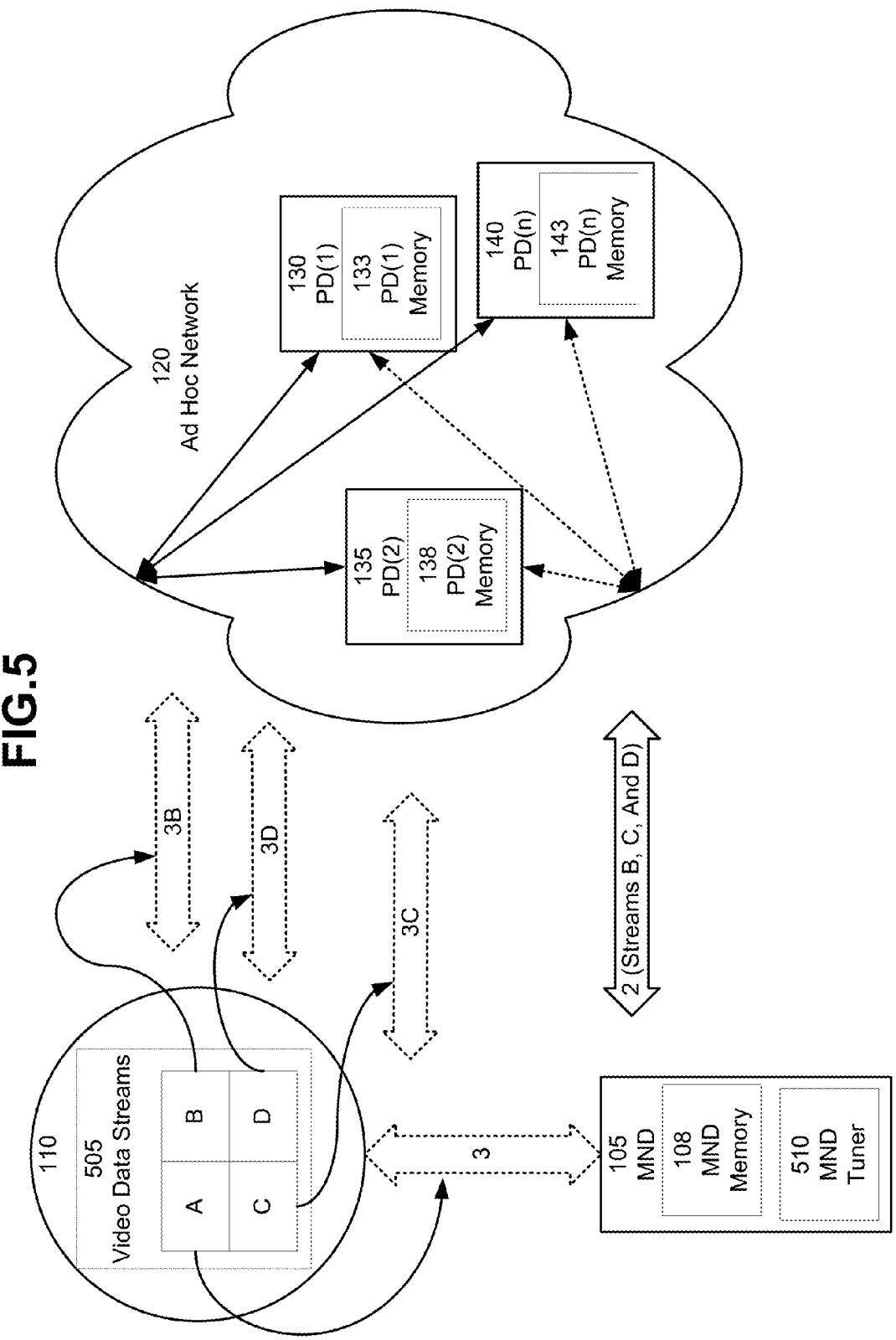

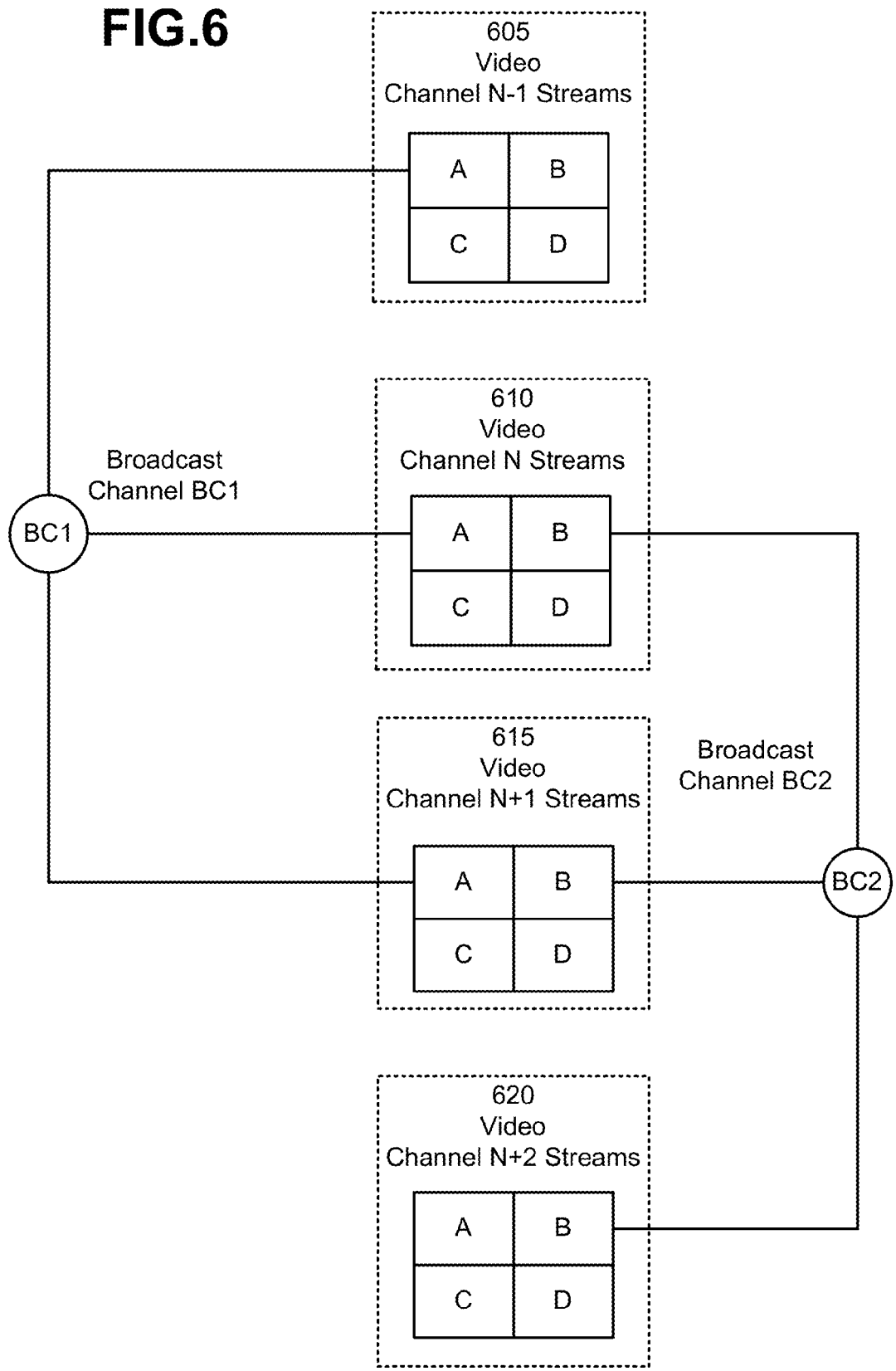

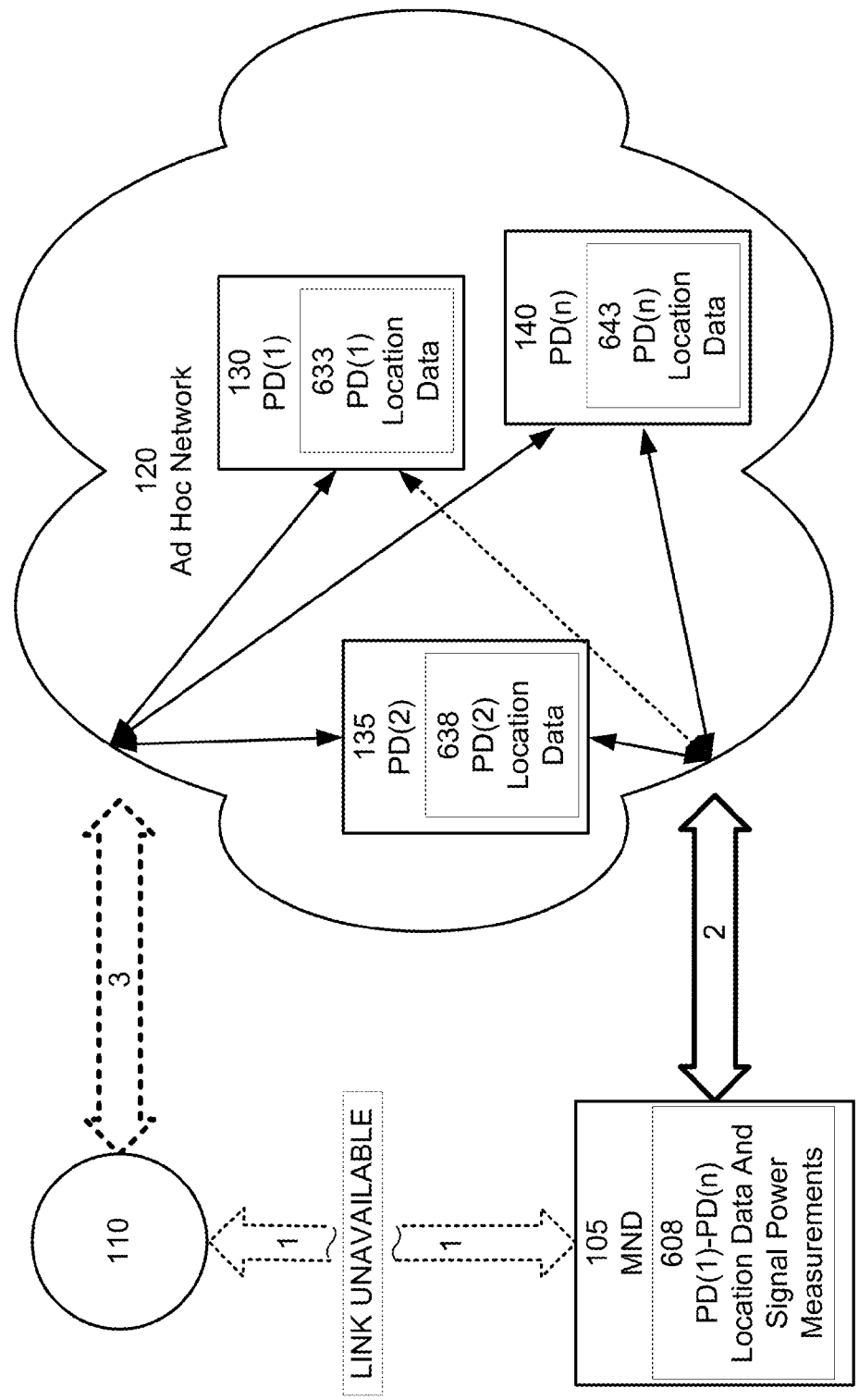

SYSTEM AND METHOD FOR USING AD HOC NETWORKS IN COOPERATION WITH SERVICE PROVIDER NETWORKS

BACKGROUND

Internet access has advanced from the early dialup system to take advantage of improving wired and wireless technologies. High capacity data networks are currently offered over cable, fiber connections, and wireless networks. For example, cellular systems operate 3 G and 4 G networks that utilize new and efficient protocols, such as Worldwide Interoperability for Microwave Access (WiMAX) and Wireless Metropolitan Area Networks (WMAN) among others to provide increasing bandwidth and coverage.

These improvements in throughput are, however, being matched by increasing demand for services such as audio and video streaming, Internet protocol (IP) television, and games that use the IP to provide significant volumes of data at the highest rates possible. The current standards for multimedia streaming, such as Microsoft Adaptive/Smooth streaming and Apple's HTTP Live Streaming, require additional power and bandwidth for each stream.

The challenge for IP service providers is to deliver as many services and to support as many customers as possible at a competitive price. The price to the subscriber of an IP service is directly related to the investment in infrastructure needed to provide a satisfactory and competitive service.

Wired network access devices may be configured to access bandwidth that is provided by the wired service provider and wireless bandwidth that is provided by a wireless service provider or that is more generally accessible and relatively inexpensive or free (a wired device with this capability may be referred to herein as a "wired multi-network device"). Wireless devices are increasingly able to access bandwidth that is provided by the wireless service provider and other wireless bandwidth that is relatively inexpensive or free (a wireless device with this capability may be referred to herein as a "wireless multi-network device").

The most prevalent protocol currently used to provide the non-service provider wireless connectivity is "WiFi." A multi-network device (wired or wireless) may communicate over one or more service provider networks (wired or wireless) and over wireless access points that may be located in homes, offices or at so-called "hotspots." When connecting to an access point, the multi-network device is in an "infrastructure mode."

Multi-network devices may also have the ability to communicate directly with each other or with a group of devices. This mode of communication is referred to as "ad-hoc" or "peer-to-peer" mode. For example, a group of WiFi devices may form a "mesh" network or a "peer-to-peer" network. In this mode, there is no master base station or access point.

For wireless multi-network devices, the WiFi capability provides an alternative network connection when the device is near a WiFi access point (AP) to off-load the mobile network traffic from the relatively more expensive wireless service provider network. However, the off-loading of network traffic from the wireless service provider does little to improve the overall throughput of the service provider network in the face of demands for large data files.

SUMMARY

Embodiments are directed to using peers to provide additional bandwidth for the communication of a data.

In an embodiment, multi-network devices communicate with each other as peers while each accesses a service provider network. The multi-network devices each receive the same real-time multimedia stream, be it broadcast or unicast, while sharing stream parity information. The peers may take corrective action to maintain uninterrupted playback of the real-time multimedia stream with no or minimal loss in perceived quality.

In another embodiment, the peers may cooperate to facilitate bandwidth and power optimization, fast channel switching, and real-time mobile traffic and network analysis, displays and alerts.

DESCRIPTION OF THE DRAWINGS

FIG. 4 is a flow diagram illustrating the use of an ad hoc network to conserve bandwidth and power usage of a service provider network according to an embodiment.

FIG. 5 is a block diagram illustrating a multi-network device utilizing connectivity with an ad hoc network to deliver both standard and high-definition video content according to an embodiment.

FIG. 6 is a block diagram illustrating a video stream multiplexing architecture to provide fast channel switching for video content according to an embodiment.

FIG. 7A is a block diagram illustrating a multi-network device utilizing connectivity with an ad hoc network to locate a mobile device according to an embodiment.

DETAILED DESCRIPTION

As used herein, the term "service provider network" encompasses both wired and wireless networks that provide access to the Internet over broadband connections for a fee. Examples of wired service provider networks include DOCSIS, ADSL, fiber networks and hybrid-fiber-cable networks.

Examples of wireless service provider networks include WiMAX, UMTS/HSDPA, CDMA/EV-DO, and EDGE networks.

As used herein, the term "WiFi" encompasses products that belong to a class of wireless local area network (WLAN) devices based on the IEEE 802.11 standards. WiFi is a trademark of the Wi-Fi Alliance.

As used herein, the term "data" encompasses the conveyance of information in electronic signals. By way of illustration and not by way of limitation, the information may be expressed as text, voice, audio, video, imagery, sensor output, hypertext and combinations of these forms.

In an embodiment, an ad hoc network of multi-network devices is configured to provide improved connectivity to a multi-network device accessing an application server via a service provider network.

Figure 1:
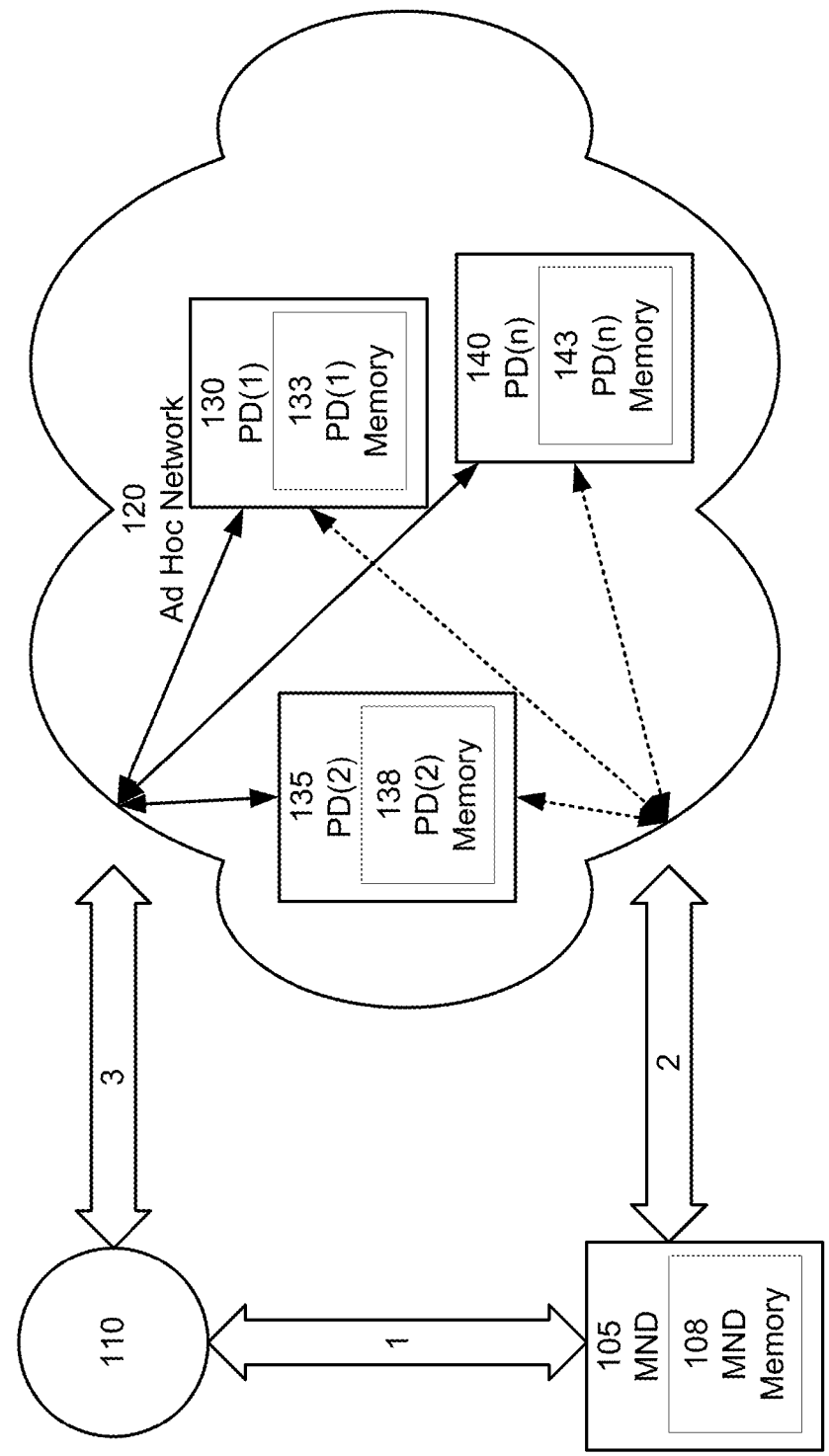
FIG. 1 is a block diagram illustrating a multi-network device in communication with a service provider via a service provider network and in communication with other peer devices according to an embodiment.

FIG. 1 is a block diagram illustrating a multi-network device in communication with a service provider via a service provider network and in communication with other peer devices according to an embodiment.

A multi-network device (MND) 105 has a primary service connection via a link 1 to network service provider 110. The link 1 is established over a network operated by or for the network service provider 110. Link 1 may be a wired or wireless link. The MND 105 is configured to establish ad-hoc connection(s) to one or more peer devices, such as peer devices PD(1) 130 and PD(2) 135 through PD(n) 140 via a link 2. The peer devices PD(1) 130 and PD(2) 135 through PD(n) 140 are also MNDs and may also have their own connections to each other as represented by ad hoc network 120. The MND 105 comprises a MND memory 108. The peer device PD(1) 130 comprises a PD(1) memory 133. The peer device PD(2) 135 comprises a PD(2) memory 138. The peer device PD(n) 140 comprises a PD(n) memory 143.

Figure 2:
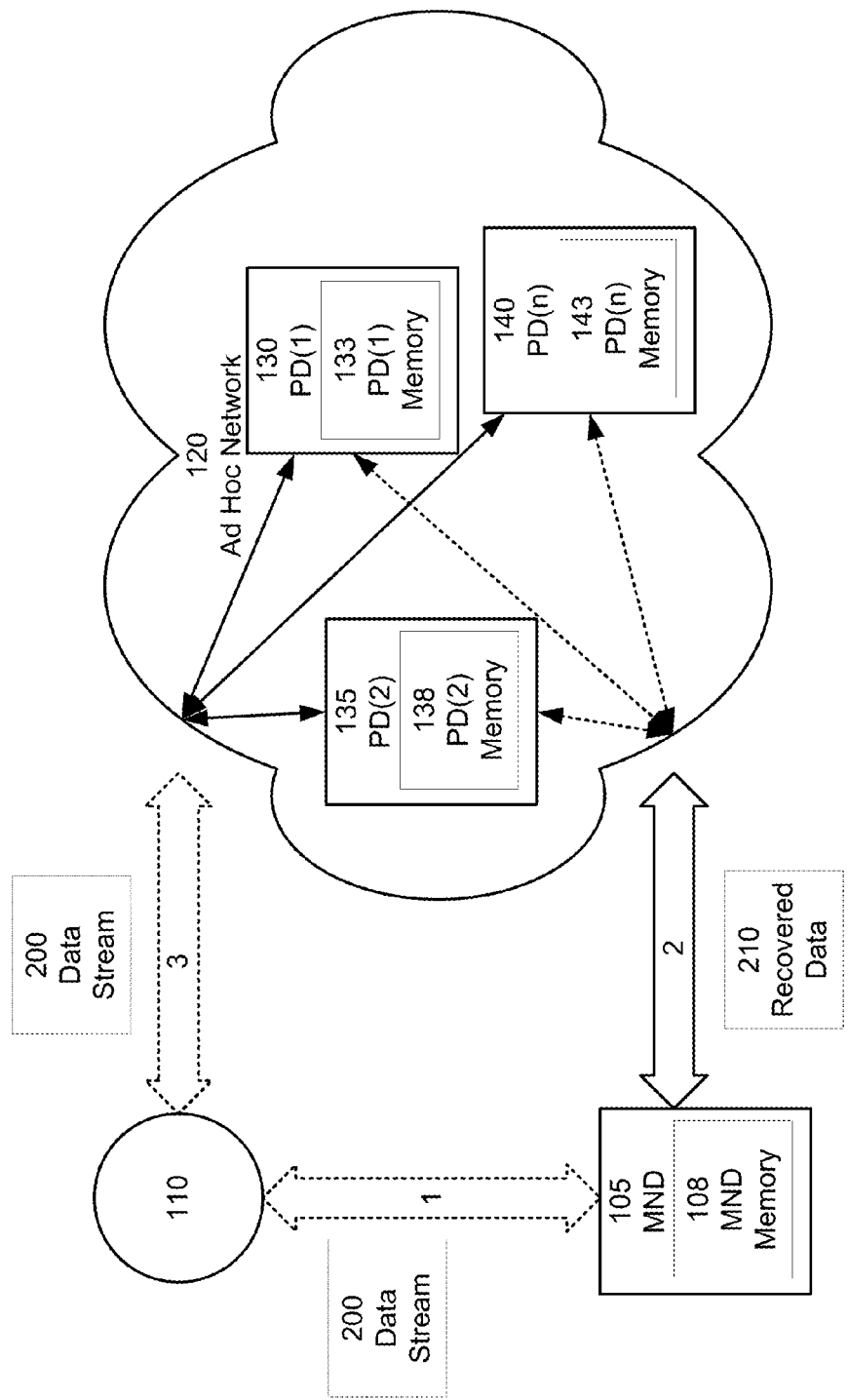
FIG. 2 is a block diagram illustrating a multi-network device receiving a data stream in cooperation with other peer devices according to an embodiment.

FIG. 2 is a block diagram illustrating a multi-network device receiving a data stream in cooperation with other peer devices according to an embodiment.

In an embodiment, the MND 105 is in communication with the network service provider 110 to obtain a data stream 200 over the link 1. Link 1 may be wired or wireless. The data stream 200 is also provided to peer devices PD(1) 130 and PD(2) 135 through PD(n) 140 via the link 3. The streamed data 200 is stored in the MND memory 108 of the MND 105, the PD(1) memory 133 of peer device PD(1) 130, the PD(2) memory 138 of peer device PD(2) 135 and the PD(n) memory 143 of the peer device PD(n) 140.

In an embodiment, the memories comprise forward error correction and parity information for data stream redundancy and tolerance of errors. In the event of degradation of link 1, the MND 105 is able to fetch data that is missing from its MND memory 108 due to the degradation of link 1 by requesting missing data fragments that may be stored in the PD memories (1 . . . n) of peer devices PD (1 . . . n) via link 2. In this way, the MND 105 may recover the data stream with little or minimal loss in perceived quality. Additionally, because the network service provider 110 is not required to re-broadcast the data stream 200 for data correction for the MND 105 and for other MNDs that may be able to connect to the ad hoc network 120, power consumption and bandwidth utilization from the network service provider 110 to the MNDs receiving the data stream 200 is reduced.

In an embodiment, the data stream 200 is a real-time data stream that is latency sensitive in nature. Streamed real-time data may be video, audio, or any multimedia information.

Figure 3:
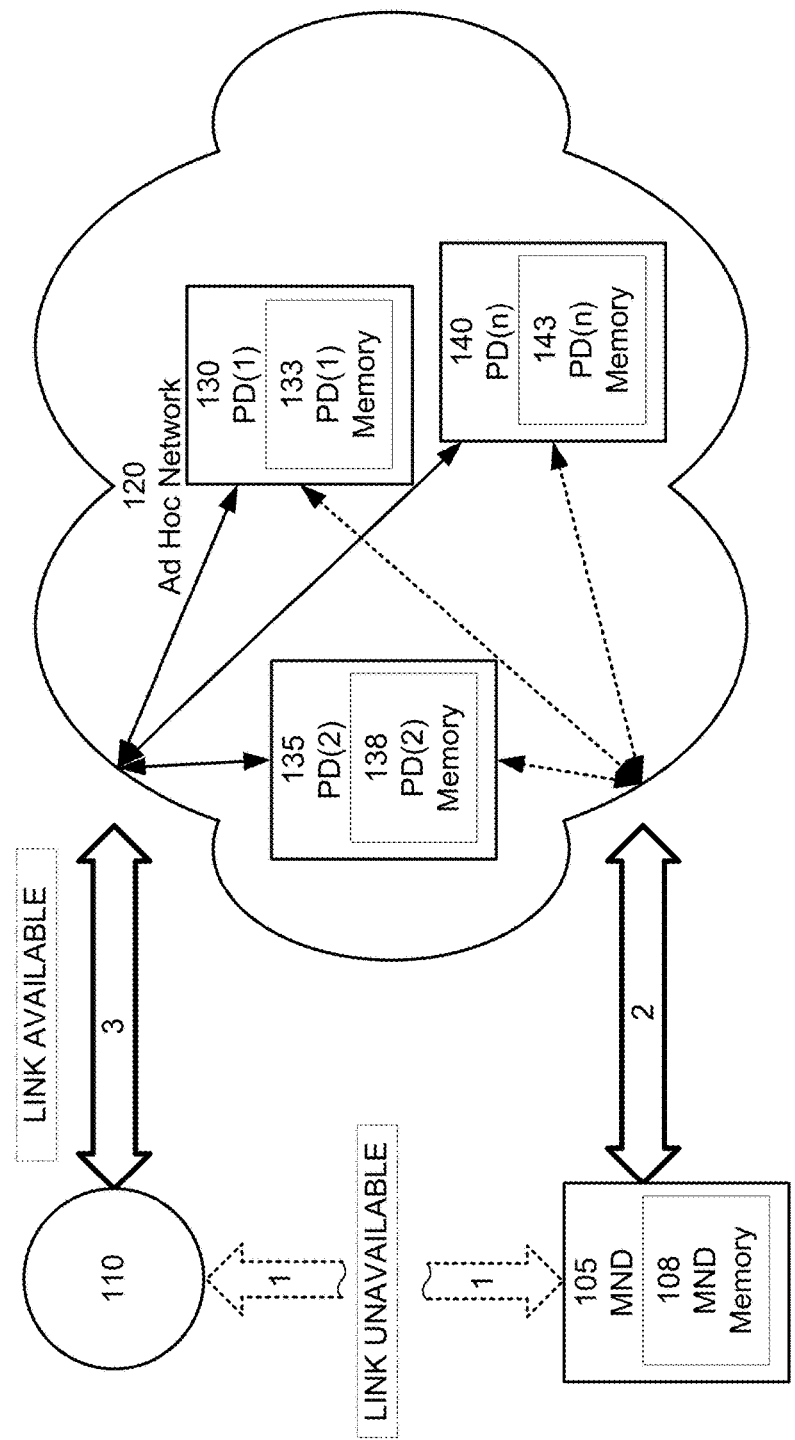
FIG. 3 is a block diagram illustrating a multi-network device utilizing connectivity with an ad hoc network to notify a network server provider of the unavailability of a link according to an embodiment.

FIG. 3 is a block diagram illustrating a multi-network device utilizing connectivity with an ad hoc network to notify a network server provider of the unavailability of a link according to an embodiment.

In an embodiment, when the link 1 is unavailable to the MND 105, the MND 105 may use a link 2 to any of the peer devices PD(1) 130 and PD(2) 135 through PD(n) 140, which may in turn connect to the network service provider 110 via a link 3.

FIG. 4 is a flow diagram illustrating the use of an ad hoc network to conserve bandwidth and power usage of a service provider network according to an embodiment.

Referring to FIGS. 2 and 4, the MND 105 is in communication with the network service provider 110 to obtain a data stream 200 over the link 1. The peer devices PD(1) 130 and PD(2) 135 through PD(n) 140 via the link 3 may communicate with the network service provider 110 via a link 3 (the PDs are also multi-network devices). As illustrated in FIG. 4, MND 105 issues a MND(1) request 1 for a data stream 200. The network service provider 110 responds to MND(1) request 1 by providing the data stream as a unicast stream 405. A MND(2) request 2 for the data stream 200 is received by the network service provider 110 from MND(2). The network service provider 110 also responds to MND(2) request 2 by providing the data stream 200 as a unicast stream 405. A MND(3) request 3 and a MND(n) request (n) for the data stream 200 is subsequently received by the network service provider 110. The network service provider 110 responds to each of these requests by providing the data stream 200 as a unicast stream 405.

In this embodiment, "n" is a threshold number that determines when the network service provider 110 transitions the data stream 200 from the unicast stream 405 to a multicast stream 410 or a broadcast stream 410. When this threshold is reached, MND 105 and the other MNDs receiving the data stream 200 may form an ad hoc network 120 to provide the redundancy described in relationship to FIG. 2. Additionally, the network service provider 110 may provide a single data stream 200 thus saving power and bandwidth.

FIG. 5 is a block diagram illustrating a multi-network device utilizing connectivity with an ad hoc network to receive both standard and high-definition video content according to an embodiment.

In an embodiment, the pixels of a high definition video display are identified by a row and a column location within an array. The pixels of the array may be grouped by blocks. As illustrated in FIG. 5, a block has two rows and two columns. The cells within the 2×2 block are labeled A, B, C and D. Pixels that are assigned to cell A are assigned to video stream A, pixels that are assigned to cell B are assigned to video stream B, pixels that are assigned to cell C are assigned to video stream C, and pixels that are assigned to cell D are assigned to video stream D.

The first block thus includes pixels from locations (1,1), (1,2), (2,1) and (2,2). The next block includes pixels from locations (1,3), (1,4), (2,3) and (2,4). The block assignments proceed across the display array until the last column is reached and then begin again with rows three and four. This process continues until all of the pixels are assigned to one of streams A, B, C and D.

Any one of the four unique streams that are produced using this pattern may be viewed on a low resolution device (quarter HD screen in this example) without a noticeable difference in quality. The streams may be broadcast simultaneously.

As illustrated in FIG. 5, the MND 105 comprises a tuner 510 that is tuned to a broadcast channel. The MND 105 receives the broadcast channel over link 3, demodulates it, and receives the video stream A. The peer devices PD(1) 130 and PD(2) 135 through PD(n) 140 each receive video streams B, C, and D via the links 3B, 3C and 3D (the tuners of the peer devices are not illustrated for clarity). Each device may view its own video stream in low resolution. If MND 105 is a high definition display and is capable of combining video streams A, B, C, and D, MND 105 may receive the video streams B, C and D from the peer devices PD(1) 130 and PD(2) 135 through PD(n) 140 and generate a high definition video stream. Additionally, the peer devices PD(1) 130 and PD(2) 135 through PD(n) 140 may provide error correction for each of the other video streams with a reasonable quality since each stream's pixels will be adjacent to one another.

FIG. 6 is a block diagram illustrating a video stream multiplexing architecture to provide fast channel switching for video content according to an embodiment.

As illustrated in FIG. 6, video stream A from video channels N−1, N, and N+1 are multiplexed into a broadcast channel BC1. Similarly, video stream B from video channels N, N+1, and N+2 are multiplexed into a broadcast channel BC2. In this configuration of video channels and broadcast channels, the broadcast channels BC1 and BC2 share video channels N and N+1. Video channel N is unique to BC1 and video channel N+2 is unique to BC2. This overlapping continuum of video channels in adjacent broadcast channels makes it possible for a device with a tuner to tune to a different broadcast channel in response to a user's selection of a video channel.

To illustrate, referring again to FIG. 5, the tuner 510 of the MND 105 is tuned to BC 1. The MND 105 is configured to receive video channel N, video stream A. When the user of the MND 105 switches to video channel N+1, the video channel N+1, stream A can be played with little or no delay because it is in the same broadcast channel (in this case, BC1) as video channel N. In this case, the MND 105 senses that the user is ascending through the video streams in BC 1 and, without disrupting the viewing of video channel N+1, instructs the tuner to tune to BC2. BC2 also includes the video channel N+1 as well as video channels N and N+2 carrying video stream B. In the event the user switches to video channel N+2, the user may be immediately presented video channel N+2, stream B. Additionally, the tuner 510 may be instructed to tune to BC3 (not illustrated) comprising video streams N+1, N+2 and N+3.

As illustrated in FIG. 5, the MND 105 receives video stream A over link 3. The peer devices PD(1) 130 and PD(2) 135 through PD(n) 140 each receive video streams B, C, and D via the links 3B, 3C and 3D. Each device may view its own video stream in low resolution. During the tuning of MND 105 from BC 1 to BC2, any dropped frame can be replaced by any peer PD(1) 130 and PD(2) 135 through PD(n) 140 that also has video channel N+1, stream A. At the end of this process, the MND 105 will display channel N+1, stream B. The process may be repeated with different channel and stream combinations.

If the MND 105 is a high definition display and is capable of combining video streams A, B, C, and D, the MND 105 may receive the video streams B, C and D from the peer devices PD(1) 130 and PD(2) 135 through PD(n) 140 and combine these streams with stream A to generate a high definition video stream.

FIG. 7A is a block diagram illustrating a multi-network device utilizing connectivity with an ad hoc network to locate a mobile device according to an embodiment.

In an embodiment, the MND 105 cannot communicate with the network service provider 110 and is unable to use any onboard GPS systems. By way of illustration and not by way of limitation, the inability to use onboard GPS systems may arise because the MND 105 is not equipped with a GPS system, the GPS system has not been activated or has failed, or because of the MND 105 is not in a location where it may receive GPS signals. The MND 105 is able to communicate with one or more peer devices PD(1) 130 and PD(2) 135 through PD(n) 140 via a link 2 to ad hoc network 120. The peer device PD(1) 130 may have PD(1) location information 633. The peer device PD(2) 135 may have PD(2) location information 638. The peer device PD(n) 140 may have PD(n) location information 643. These peer devices PD(1 . . . n) may have but do not require active connections to the network service provider 110 via a link 3.

The MND 105 may query all reachable peer devices PD(1) 130 and PD(2) 135 through PD(n) 140 for their location data. In an embodiment, location information may include latitude, longitude, estimated location accuracy, and the signal strength of the MND 105 as determined by PD(1) 130 and PD(2) 135 through PD(n) 140.

Accuracy values may reflect the source of the location data for each of the reachable peer devices PD(1) 130 and PD(2) 135 through PD(n) 140. By way of illustration, a peer device may obtain its location information from a relatively high-accuracy method such as A-GPS, or it may obtain its location information from a relatively low-accuracy method such as the Cell ID-based location. For each of the reachable peer devices PD(1) 130 and PD(2) 135 through PD(n) 140, the MND 105 also captures a received signal power measurement.

The MND 105 may use the location data and signal strength measurements obtained from the reachable peer devices PD(1) 130 and PD(2) 135 through PD(n) 140 and its measurement of the signal power of each of the reachable peers to estimate its location.

By way of illustration and not by way of limitation, a set of i reachable peer devices comprising reachable peer devices PD(1) 130 and PD(2) 135 through PD(n) 140 is sampled. In this example, the MND 105 may receive each peer device's estimated location coordinates of $x_i$, $y_i$ and each peer device's probability circle radius representing the accuracy range of its estimated location $A_i$. Furthermore, the MND 105 is able to measure the relative signal strength $R_i$ of the peer link transmitted from each reachable peer device PD(1) 130 and PD(2) 135 through PD(n) 140. From these data, the location of the MDN 105 at coordinates $\bar{x}, \bar{y}$ having an accuracy of A, where $\bar{x}, \bar{y}$ is the weighted mean of the location data acquired from the set of i reachable peer devices. More particularly, $$\bar{x} = \sum_{i=1}^{n} W_i x_i \qquad [1]$$

$$\bar{y} = \sum_{i=1}^{n} W_i y_i \qquad [2]$$

with the radius of the probability circle A around $\bar{x}, \bar{y}$ of $$A = (2 - W_{i_{max}}) A_i \qquad [3]$$

where:

$$W_i = \frac{R_i}{A_i}$$

and is on a normalized scale such that for all $W_i$, $$\sum_{i=1}^{n} W_i = 1 \quad [4]$$

and $W_{i_{max}}$ is the maximum member of the set of weighting factors $W_i$ having its specific peer device's probability accuracy circle of radius $A_i$.

Figure 7B:
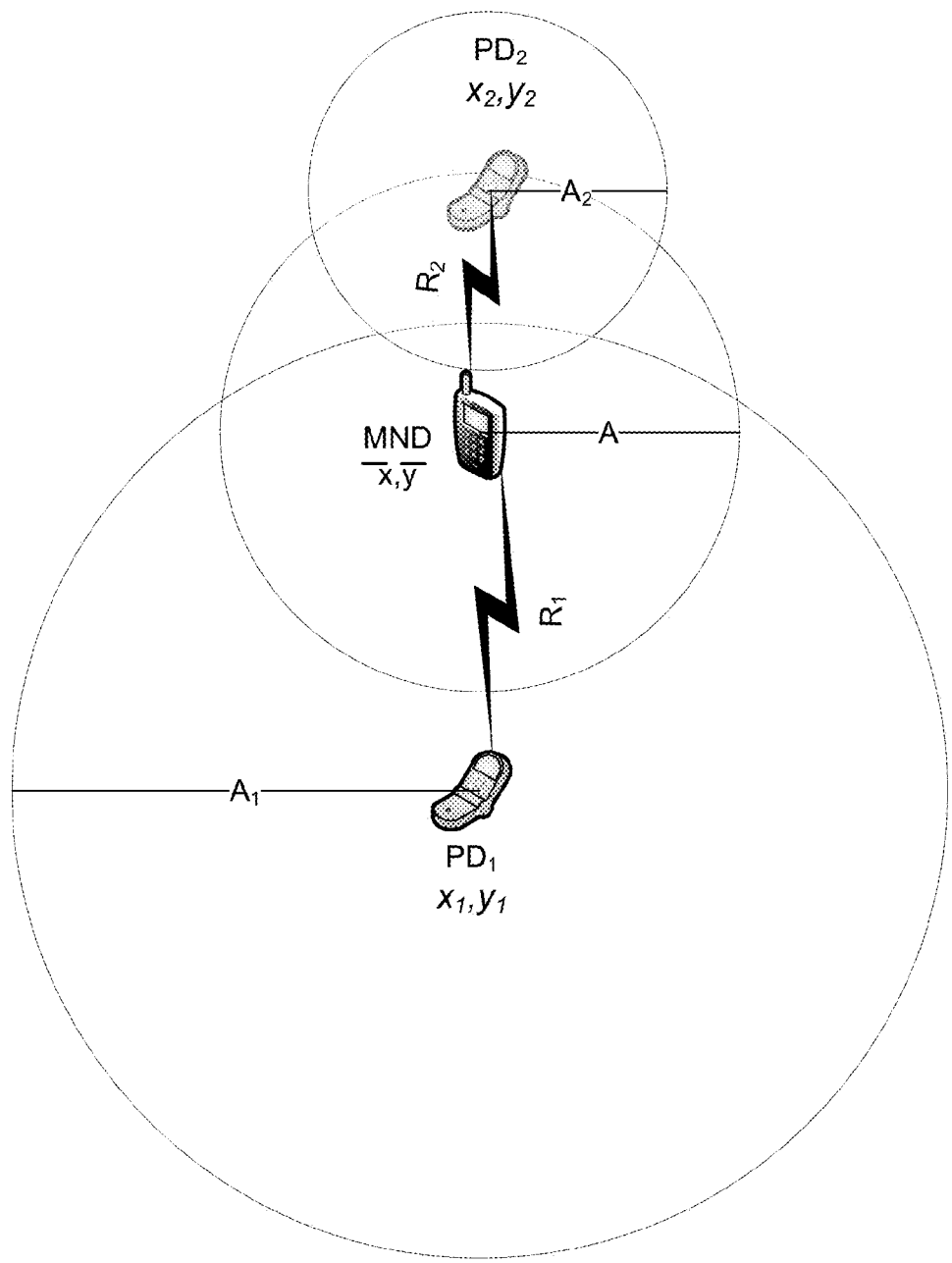
FIG. 7B is a diagram illustrating variables useful in determining the location of a device from data received from other devices.

FIG. 7B is a diagram illustrating variables useful in determining the location of a device from data received from other devices. As illustrated in FIG. 7B, a longer "distance" drawn above for R corresponds to a lower RSSI measurement, i.e., the weaker the RSSI the more likely it is that the MND is farther away from a particular $PD_i$.

Figure 8:
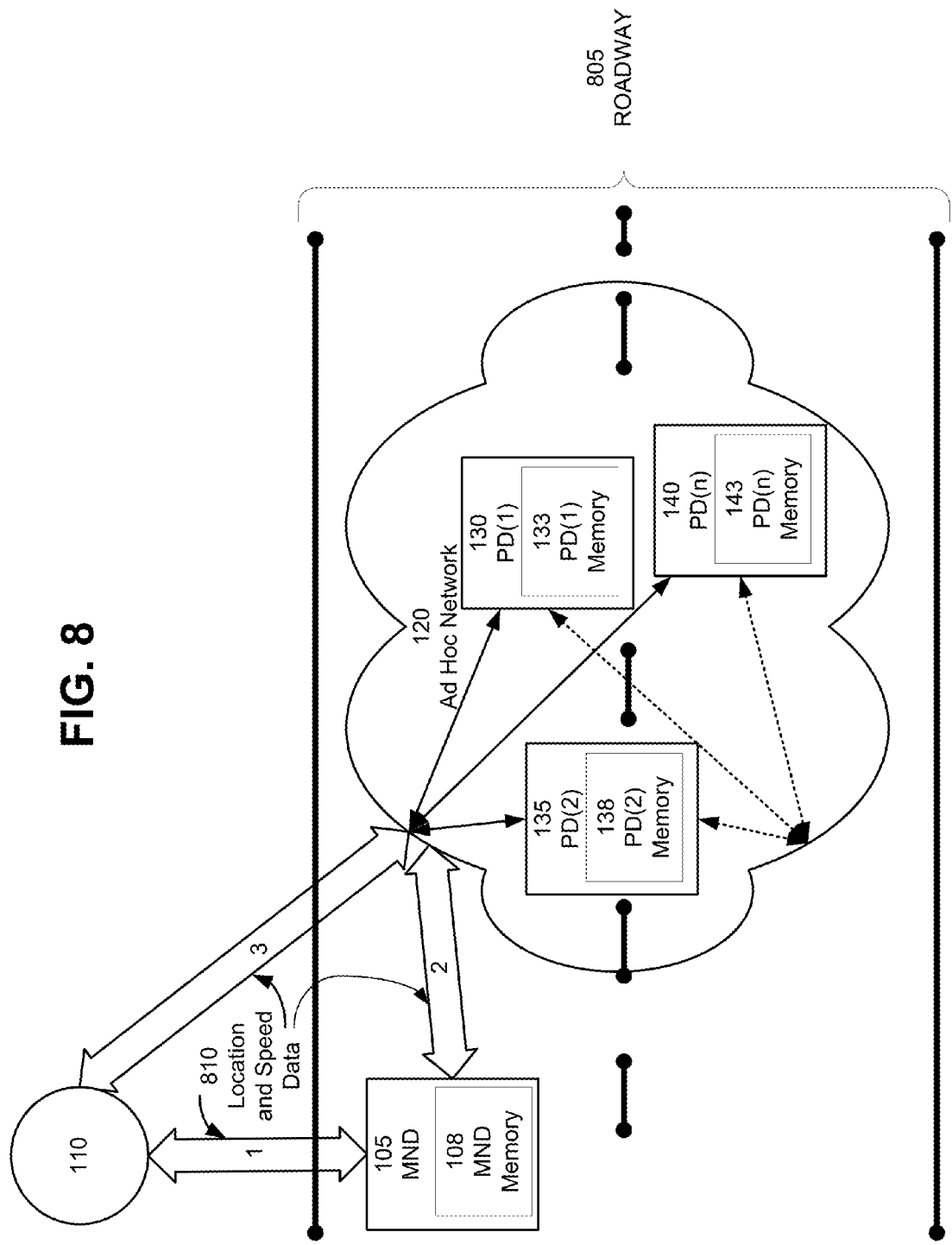
FIG. 8 is a block diagram illustrating a multi-network device utilizing connectivity with an ad hoc network to provide real-time peer assisted mobile traffic analysis and alerts according to an embodiment.

FIG. 8 is a block diagram illustrating a multi-network device utilizing connectivity with an ad hoc network to provide real-time peer assisted mobile traffic analysis and alerts according to an embodiment.

The MND 105 is a mobile device in an automobile traveling in a given direction on a roadway 805. In an embodiment, the MND 105 may further comprise traffic pattern data that establish a "norm" for locations along roadway 805.

The MND 105 may query all reachable peer devices PD(1) 130 and PD(2) 135 through PD(n) 140 that are also traveling in the same direction and using the same route some distance ahead of the MND 105 for their current location and speed data 810 via the link 2.

In an embodiment, the MND 105 may comprise a processor and software instructions that allow the processor to evaluate the location and rate data 810 received via the link 2 against the "normal" data for a current location along roadway 805. Real-time traffic congestion can be detected when there is a large population of peer devices PD(1) 130 and PD(2) 135 through PD(n) 140 reporting slow progress within a small area that is inconsistent with the normal traffic pattern for the particular location on the roadway 805.

In an embodiment, the normal data may be updated with received data to reflect a change in the traffic norm for a location on the roadway 805.

The software instructions may further allow the processor to issue an alert to a user of the MND 105 of the impending traffic congestion. In an embodiment, the software instructions also allow the user of the MND 105 to indicate a destination. The software instructions may then allow the processor to offer a choice of detours that are less congested.

In yet another embodiment, the MND 105 may report its location and speed data 810 to network service provider 110 as well as the location and speed data of peer devices PD(1) 130 and PD(2) 135 through PD(n) 140 through link 1 for real-time traffic alerts network wide. In an embodiment, the aggregated traffic conditions for a given area may be displayed on a map as a color coded overlay. For example, clear (alpha channel) may be used to indicate little to no network reported data, light green may be used to indicate light traffic, dark green may be used to indicate traffic congestion, and brown may be used to indicate heavy traffic congestion. Icons can be placed on top of an area with confirmed traffic and hazard conditions. Another icon may indicate the current location of the MND 105 D. Details of the traffic condition and hazards may also be linked to the icons for user interactions.

Figure 9:
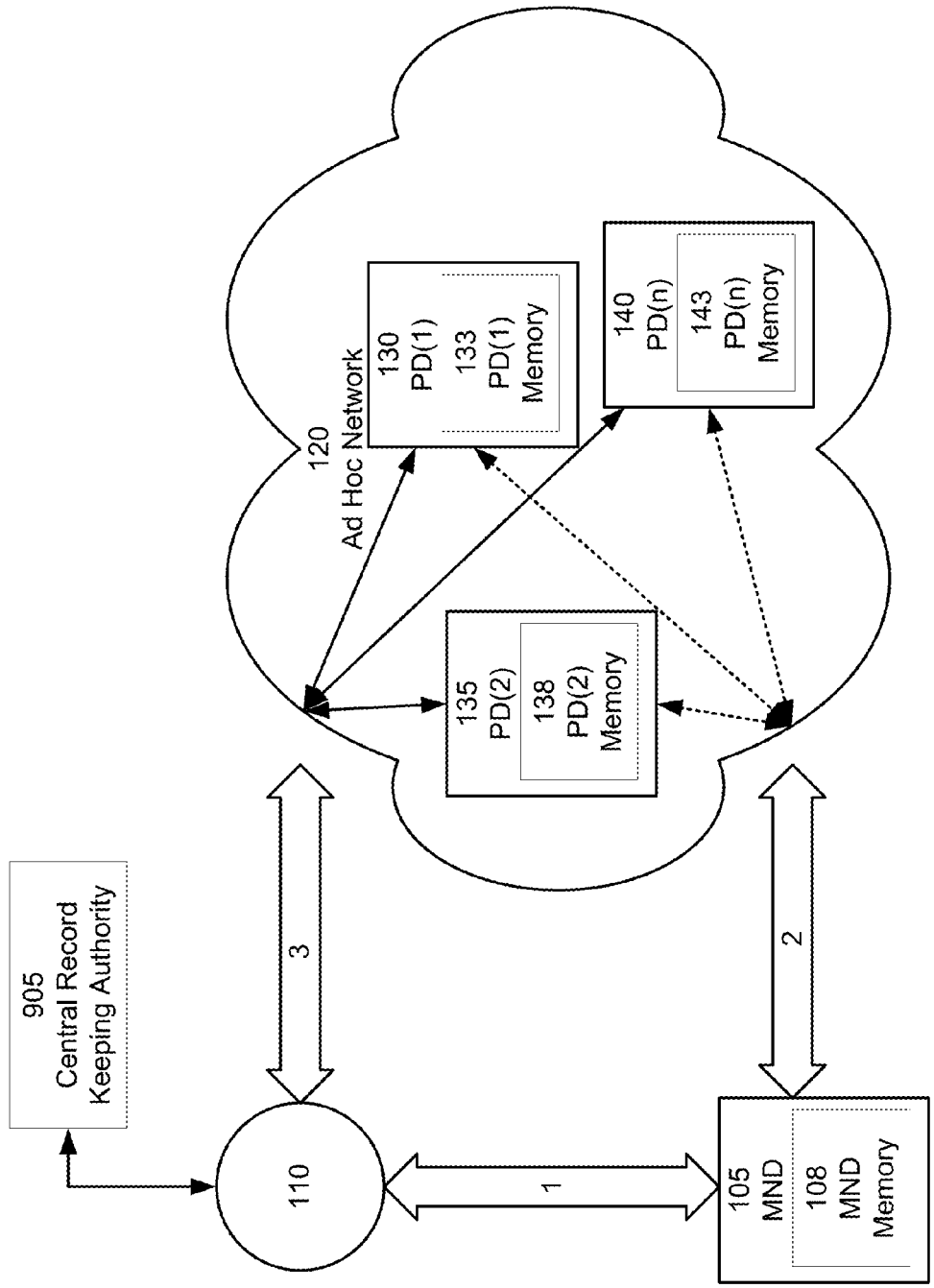
FIG. 9 is a block diagram illustrating a central record keeping authority for logging exchanges of data among peers according to an embodiment.

FIG. 9 is a block diagram illustrating a central record keeping authority for logging exchanges of data among peers according to an embodiment.

A multi-network device (MND) 105 has a primary service connection via a link 1 to network service provider 110. The link 1 is established over a network operated by or for the network service provider 110. Link 1 may be a wired or wireless link. The MND 105 is configured to establish ad-hoc connection(s) to one or more peer devices, such as peer devices PD(1) 130 and PD(2) 135 through PD(n) 140 via a link 2. The peer devices PD(1) 130 and PD(2) 135 through PD(n) 140 are also MNDs and may also have their own connections to each other as represented by ad hoc network 120. The MND 105 comprises a MND memory 108. The peer device PD(1) 130 comprises a PD(1) memory 133. The peer device PD(2) 130 comprises a PD(2) memory 138. The peer device PD(n) 140 comprises a PD(n) memory 143.

In an embodiment, MND 105 and peer devices PD(1) 130 and PD(2) 135 through PD(n) 140 each records in its memory all data it receives from all other devices. Thus, the MND 105 will record data received from all other devices in the ad hoc network 120 in MND memory 108. The peer device PD(1) 130 will record data received from all other devices in the ad hoc network 120 in PD(1) memory 133. The peer device PD(2) 130 will record data received from all other devices in the ad hoc network 120 in PD(2) memory 138. The peer device PD(n) 140 will record data received from all other devices in the ad hoc network 120 in PD(n) memory 143.

Each device in ad hoc network 120 forwards all data back to a central record keeping authority 905. When a device receives a confirmation that its data has been archived, the device may free its memory to receive new data.

In an embodiment, a device may request retransmission from other devices for missing data. Additionally, devices belonging to the ad hoc network 120 that do not have a direct connection to the network service provider 110 may forward data through other members of the ad hoc network 120 until a member node with a connection to network service provider 110 is reached.

In an embodiment, the delivery of data to the central record keeping authority 905 may be in real-time or it may be scheduled in accordance with a policy. The policy may, for example, establish a priority among nodes or it may grant priority to a node requesting it.

The delivery of data to a central location allows all members of a peer network to access data provided by other members of the peer network to a central authority even when out of range of those peers. By way of illustration and not by way of limitation, MND 105 and peer devices PD(1) 130 and PD(2) 135 through PD(n) 140 may represent a network of emergency responders. In this example, MND 105 may perform the role of forwarding data to the central record keeping authority (e.g., the network service provider 110) and relaying information to other network members.

Figure 10:
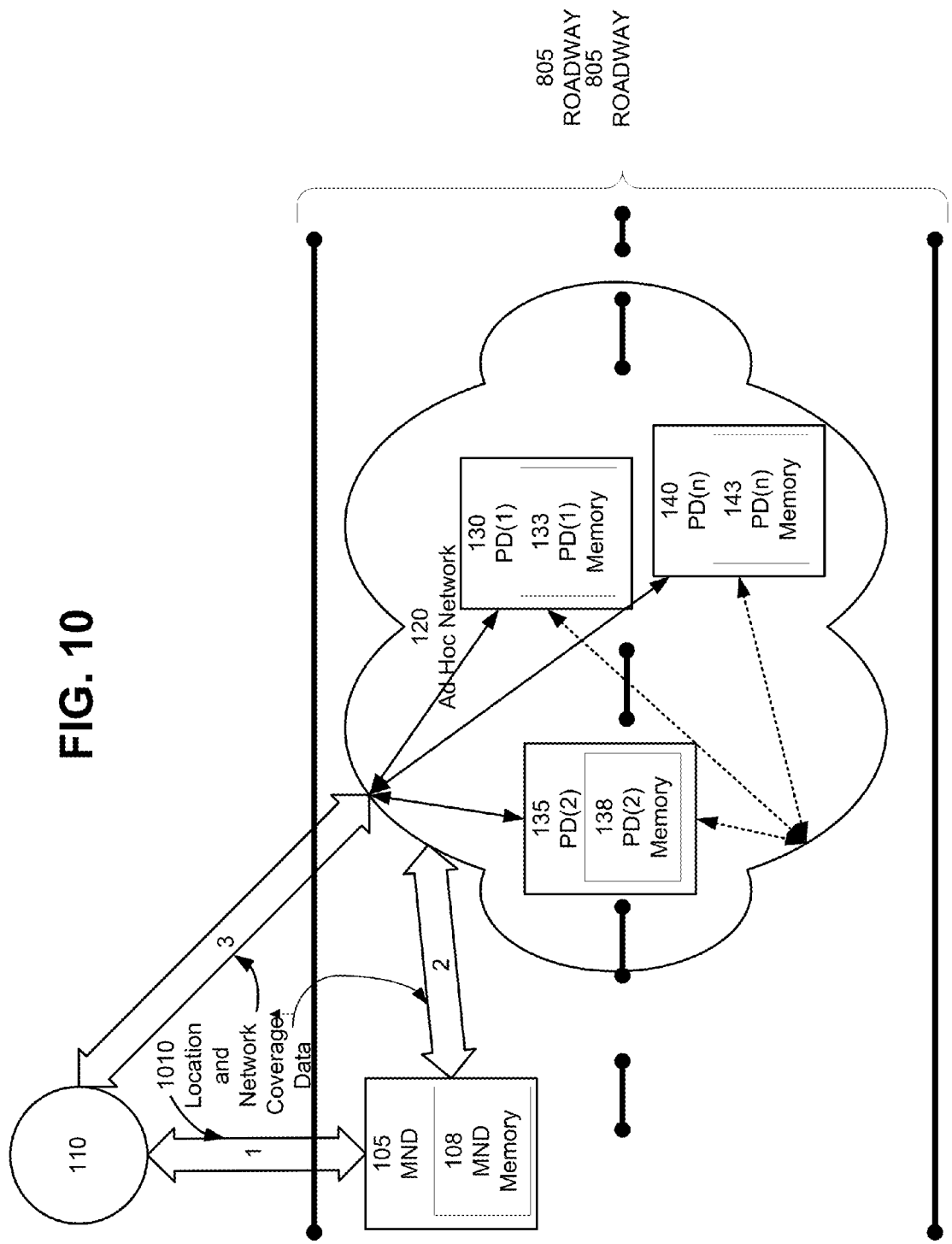
FIG. 10 is a block diagram illustrating a multi-network device utilizing connectivity with an ad hoc network to provide real-time peer assisted wireless network coverage analysis and alerts according to an embodiment.

FIG. 10 is a block diagram illustrating a multi-network device utilizing connectivity with an ad hoc network to provide real-time peer assisted wireless network coverage analysis and alerts according to an embodiment.

The MND 105 may query all reachable peer devices PD(1) 130 and PD(2) 135 through PD(n) 140 that are also traveling in the same direction and using the same route some distance ahead of the MND 105 for their location and network coverage data 1010. The network coverage data may, for example, include RF signal power, signal quality, and bandwidth usage.

In an embodiment, the MND 105 may comprise a processor and software instructions that allow the processor to evaluate the network coverage data and location data 1010 received from the other members of the ad hoc network 140. When the reported network coverage data indicates a drop in wireless coverage quality, the MND 105 may alert the user of the impending network coverage brownout or outage. Using the location information, the software instructions may also allow the processor to suggest possible route changes to remain in the coverage area, or, given the current speed of travel of the MND 105, how long before coverage will end and then be restored if the MND 105 continues to travel in the same route and at the same speed.

In addition, the MND 105 may also report its analysis back to the network service provider 110 through the link 1 as coverage data and as aggregated coverage data thereby providing real-time coverage reporting network wide in case the coverage outage is due to failure in network equipment. In an embodiment, the aggregated real time coverage information for a given area may be displayed on a map as a color coded overlay. For example, the overlay may be clear to indicate little to no coverage, light green may be used to indicate coverage and light usage, and dark green may be used to indicate heavy network bandwidth usage. The overlay may display any of the aggregated measurement recorded by the MND 105. Icons may be placed on top of an area with network coverage issues. Details of the network coverage conditions can be linked to the icons for user interactions. This map overlay may also be used by network work-force management to dispatch repair crews to outage locations and for network customer service to communicate network status and conditions to consumers without costly service calls.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Further, words such as "thereafter," "then," "next," etc. are not intended to limit the order of the steps; these words are simply used to guide the reader through the description of the methods.

Figure 11:
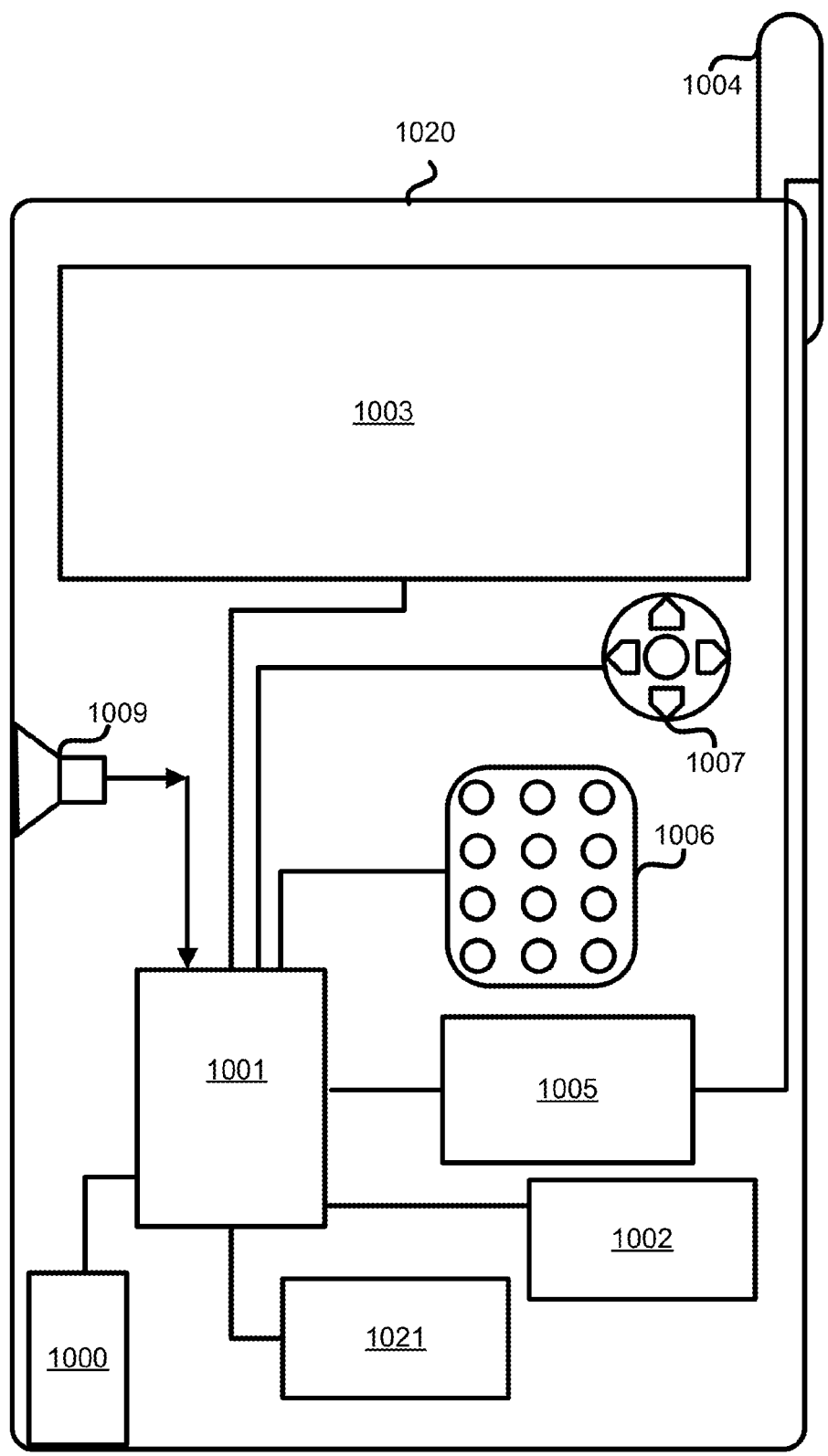
FIG. 11 is a component block diagram illustrating a computing device suitable for use in the various embodiments.

Typical computing devices suitable for use with certain embodiments will have in common the components illustrated in FIG. 11. For example, the exemplary computing device 1020 may include a processor 1001 coupled to an internal memory 1002, to a display 1003 and to a SIM 1009 or similar removable memory unit. Additionally, the computing device 1020 may have an antenna 1004 for sending and receiving electromagnetic radiation that is connected to a transceiver 1005 coupled to the processor 1001. In some implementations, the transceiver 1005 and portions of the processor 1001 and memory 1002 may be used for multi-network communications. Computing devices typically also include a key pad 1006 or miniature keyboard and menu selection buttons or rocker switches 1007 for receiving user inputs. Computing device 1020 may also include a GPS navigation device 1000 coupled to the processor and used for determining the location coordinates of the computing device 1020.

The processor 1001 may be any programmable microprocessor, microcomputer or multiple processor chip or chips that can be configured by software instructions (applications) to perform a variety of functions, including the functions of the various embodiments described herein. In some computing devices, multiple processors 1001 may be provided, such as one processor dedicated to wireless communication functions and one processor dedicated to running other applications. Typically, software applications may be stored in the internal memory 1002 before they are accessed and loaded into the processor 1001. In some computing devices, the processor 1001 may include internal memory sufficient to store the application software instructions. The internal memory of the processor may include a secure memory (not illustrated) which is not directly accessible by users or applications and that is capable of recording MDINs and SIM IDs as described in the various embodiments. As part of the processor, such a secure memory may not be replaced or accessed without damaging or replacing the processor. In some computing devices, additional memory chips (e.g., a Secure Data (SD) card) may be plugged into the device 1020 and coupled to the processor 1001. In many computing devices, the internal memory 1002 may be a volatile or non-volatile memory, such as flash memory, or a mixture of both. For the purposes of this description, a general reference to memory refers to all memory accessible by the processor 1001, including internal memory 1002, removable memory plugged into the computing device, and memory within the processor 1001 itself, including the secure memory.

The computing device 1020 may further comprise a video receiver unit 1021 to provide video demodulation and tuning capabilities. The video receiver unit 1021 may be implemented in hardware, software or a combination of hardware and software.

Figure 12:
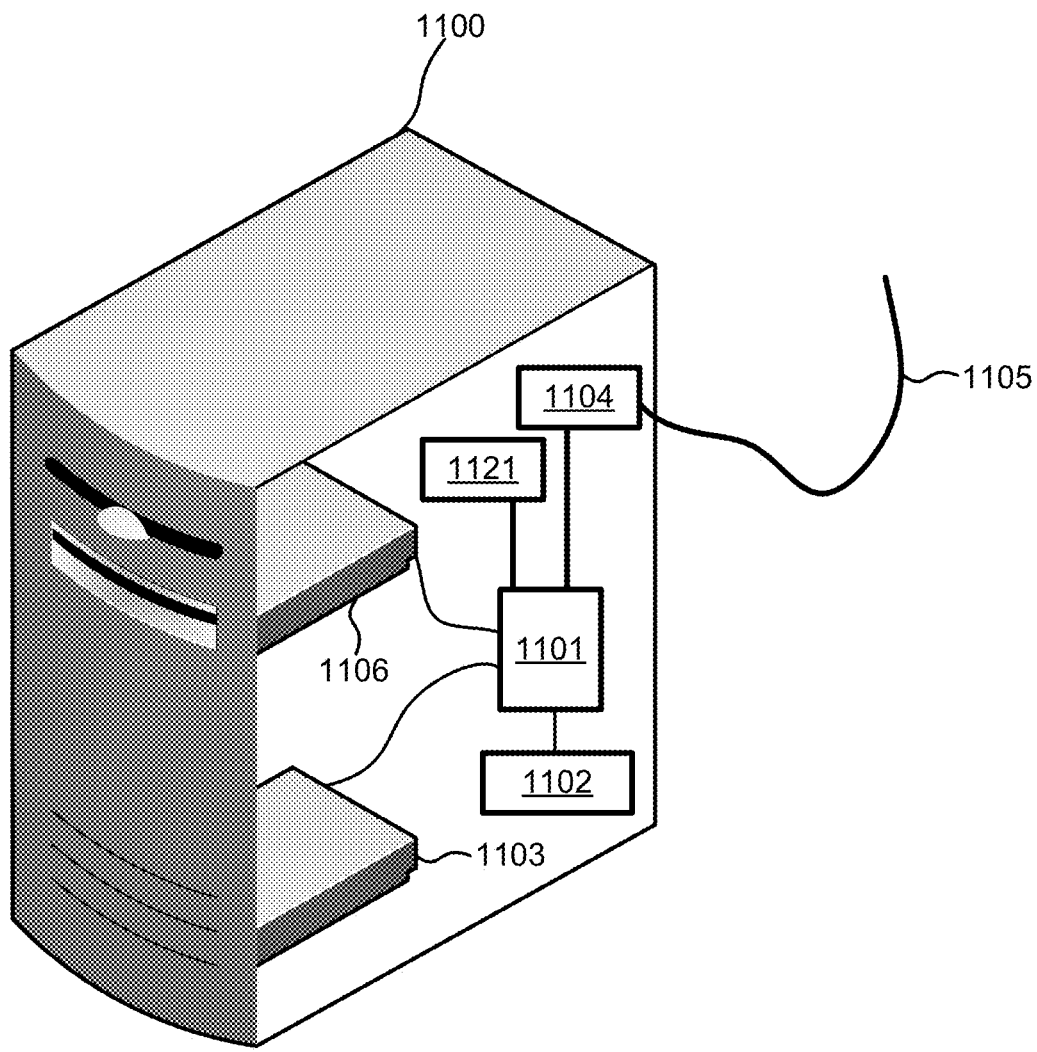
FIG. 12 is a component block diagram illustrating another computing device suitable for use in the various embodiments.

A number of the embodiments described above may also be implemented with any of a variety of computing devices, such as the computing device 1100 illustrated in FIG. 12. Such a computing device 1100 typically includes a processor 1101 coupled to volatile memory 1102 and a large capacity nonvolatile memory, such as a disk drive 1103. The computing device 1100 may also include a floppy disc drive and/or a compact disc (CD) drive 1106 coupled to the processor 1101. The computing device 1100 may also include network access ports 1104 coupled to the processor 1101 for establishing data connections with network circuits 1105 over a variety of wired and wireless networks using a variety of protocols. The computing device 1100 may further comprise a video receiver unit 1121 to provide video demodulation and tuning capabilities. The video receiver unit 1121 may be implemented in hardware, software or a combination of hardware and software.

While the computing device 1100 is illustrated as using a desktop form factor, the illustrated form is not meant to be limiting. For example, some or all of the components of computing device 1100 may be implemented as a desktop computer, a laptop computer, a mini-computer, or a personal data assistant.

The foregoing method descriptions and the process flow diagrams are provided merely as illustrative examples and are not intended to require or imply that the blocks of the various embodiments must be performed in the order presented. As will be appreciated by one of skill in the art the order of blocks in the foregoing embodiments may be performed in any order. Words such as "thereafter," "then," "next," etc. are not intended to limit the order of the blocks; these words are simply used to guide the reader through the description of the methods. Further, any reference to claim elements in the singular, for example, using the articles "a," "an," or "the," is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some blocks or methods may be performed by circuitry that is specific to a given function.

In one or more exemplary aspects, the functions described may be implemented in hardware, software, firmware, or any combination thereof. If implemented in software, the functions may be stored on or transmitted over as one or more instructions or code on a computer-readable medium. The blocks of a method or algorithm disclosed herein may be embodied in a processor-executable software module, which may reside on a computer-readable medium. Computer-readable media includes both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a machine readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the scope of the invention. Thus, the present invention is not intended to be limited to the embodiments shown herein but is to be accorded the widest scope consistent with the following claims and the principles and novel features disclosed herein.

What is claimed is:

1. A system for receiving data over multiple communication links comprising:
   a server comprising communication circuitry configured to broadcast data and a server processor coupled to the communication circuitry;
   a first multi-network device comprising a first memory and a first device processor coupled to the first memory; and
   a second multi-network device comprising a second memory and a second device processor coupled to the second memory,
   wherein the first device processor is configured with processor-executable instructions to perform operations comprising:
      receiving broadcast data from the server via a broadcast communication link;
      storing the broadcast data received via the broadcast communication link in the first memory;
      determining whether the stored broadcast data includes missing data fragments;
      determining whether the second multi-network device is in communication range of the first multi-network device;
      establishing a direct wireless communication link with the second multi-network device after determining that the stored broadcast data includes missing data fragments and after determining that the second multi-network device is in communication range of the first multi-network device; and
      receiving the missing data fragments from the second multi-network device via the direct wireless communication link established after determining that the stored data includes missing data fragments, and
   wherein the second device processor is configured with processor-executable instructions to perform operations comprising:
      receiving data from the server via the broadcast communication link;
      storing the received data in the second memory; and
      sending portions of the data stored in the second memory to the first multi-network device over the direct wireless communication link as the missing data fragments.

2. The system of claim 1, wherein the first multi-network device is selected from the group consisting of a smart phone, a portable computer, a desktop computer, and a gateway.

3. The system of claim 1, wherein the provider server is coupled to a network service provider selected from the group consisting of a data over cable service interface specification (DOCSIS) service provider, an asymmetric digital subscriber line (ADSL) service provider, a fiber service provider, a worldwide interoperability for microwave access (WiMAX) service provider, a universal mobile telecommunications system/high-speed downlink packet access (UMTS/HSDPA) service provider, a code division multiple access/evolution-data optimized (CDMA/EV-DO) service provider, and an enhanced data rates for gsm evolution (EDGE) service provider.

4. The system of claim 1, wherein the first device processor is configured with processor-executable instructions such that receiving broadcast data from the server comprises receiving video data over the broadcast communication link.

5. A multi-network device method of receiving data over multiple communication links comprising:

receiving in a processor of the multi-network device broadcast data transmitted from a server over a broadcast communication link;
storing the broadcast data received via the broadcast communication link in a first memory of the first multi-network device;
determining whether the stored broadcast data includes missing data fragments;
determining whether a second multi-network device is in communication range of the first multi-network device;
establishing a direct wireless communication link with the second multi-network device after determining that the stored data includes missing data fragments and after determining that the second multi-network device is in communication range; and
receiving the missing data fragments from the second multi-network device via the direct wireless communication link established with the second multi-network device after determining that the stored broadcast data includes missing data fragments.

6. The multi-network device method of claim 5, wherein receiving in a processor of the multi-network device broadcast data transmitted from the server over the broadcast communication link comprises receiving broadcast data in a device selected from the group consisting of a smart phone, a portable computer, a desktop computer, and a gateway.

7. The multi-network device method of claim 5, wherein receiving in a processor of the multi-network device broadcast data transmitted from the server over the broadcast communication link comprises receiving data from a server coupled to a network service provider selected from the group consisting of a DOCSIS service provider, an asymmetric digital subscriber line (ADSL) service provider, a fiber service provider, a worldwide interoperability for microwave access (WiMAX) service provider, a universal mobile telecommunications system/high-speed downlink packet access (UMTS/HSDPA) service provider, a code division multiple access/evolution-data optimized (CDMA/EV-DO) service provider, and an enhanced data rates for gsm evolution (EDGE) service provider.

8. The multi-network device method of claim 5, wherein receiving in a processor of the multi-network device broadcast data transmitted from the server over the broadcast communication link comprises receiving video data over the broadcast communication link.

9. The system of claim 1, wherein the first device processor is configured with processor-executable instructions such that determining whether the stored broadcast data includes missing data fragments comprises performing forward error correction operations on the stored data.

10. The system of claim 1, wherein the first device processor and the second device processor are each configured with processor-executable instructions such that receiving broadcast data transmitted from the server over the broadcast communication link comprises receiving shared parity information over the broadcast communication link.

11. The system of claim 4, wherein:
the server processor is configured with server-executable instructions to perform operations comprising:
organizing the video data into a plurality of pixel blocks, each pixel block including information for a unique location in a display array;
grouping the pixel blocks into a first group and a second group;
transmitting the first group of pixel blocks over a first broadcast channel of the broadcast communication link; and
transmitting the second group of pixel blocks over a second broadcast channel of the broadcast communication link,
the first device processor is configured with processor-executable instructions to perform operations such that receiving video data over the broadcast communication link comprises receiving the first group of pixel blocks via the first broadcast channel, and
the second device processor is configured with processor-executable instructions to perform operations such that:
receiving data from the server via the broadcast communication link comprises receiving the second group of pixel blocks via the second broadcast channel; and
sending portions of the data stored in the second memory to the first multi-network device over the direct wireless communication link as the missing data fragments comprises sending the second group of pixel blocks to the first multi-network device over the direct wireless communication link as the missing data fragments.

12. The multi-network device method of claim 5, wherein determining whether the stored broadcast data includes missing data fragments comprises performing forward error correction operations on the stored broadcast data.

13. A multi-network device, comprising:
a memory; and
a processor coupled to the memory, wherein the processor is configured with processor-executable instructions to perform operations comprising:
receiving broadcast data transmitted from a server over a broadcast communication link;
storing the broadcast data received via the broadcast communication link in the memory;
determining whether a second multi-network device is in communication range of the first multi-network device;
determining whether the stored broadcast data includes missing data fragments;
establishing a direct wireless communication link with the second multi-network device after determining that the stored data includes missing data fragments and after determining that the second multi-network device is in communication range; and
receiving the missing data fragments from the second multi-network device via the direct wireless communication link with the second multi-network device after determining that the stored broadcast data includes missing data fragments.

14. The multi-network device of claim 13, wherein the processor is configured with processor-executable instructions such that determining whether the stored broadcast data includes missing data fragments comprises performing forward error correction operations on the stored broadcast data.

* * * * *